(12) United States Patent
Hu et al.

(10) Patent No.: US 8,419,222 B2
(45) Date of Patent: Apr. 16, 2013

(54) ELECTRONIC READING SYSTEM

(75) Inventors: Sha-Sha Hu, Shenzhen (CN);
Yan-Xiang Huang, Shenzhen (CN);
Ting Gong, Shenzhen (CN); Ting Dong,
Shenzhen (CN); Bo-Ching Lin, New
Taipei (TW)

(73) Assignees: **Hong Fu Jin Precision Industry
(ShenZhen) Co., Ltd.**, Shenzhen (CN);
Hon Hai Precision Industry Co., Ltd.,
New Taipei (TW)

( * ) Notice: Subject to any disclaimer, the term of this patent is extended or adjusted under 35 U.S.C. 154(b) by 170 days.

(21) Appl. No.: 13/166,780

(22) Filed: Jun. 22, 2011

(65) Prior Publication Data

US 2012/0162992 A1 Jun. 28, 2012

(30) Foreign Application Priority Data

Dec. 28, 2010 (CN) .......................... 2010 1 0609614

(51) Int. Cl.
*F21V 33/00* (2006.01)
(52) U.S. Cl.
USPC ............... 362/253; 362/98; 362/99; 362/118; 362/203

(58) Field of Classification Search ............. 362/98, 362/99, 118, 157, 202, 203, 206, 253, 603
See application file for complete search history.

(56) References Cited

U.S. PATENT DOCUMENTS

| | | | | |
|---|---|---|---|---|
| 2002/0080610 | A1* | 6/2002 | Butt | 362/259 |
| 2003/0222859 | A1* | 12/2003 | Huang et al. | 345/179 |
| 2005/0039052 | A1* | 2/2005 | O'Donnell et al. | 713/201 |
| 2006/0181870 | A1* | 8/2006 | Sharrah et al. | 362/157 |
| 2008/0298083 | A1* | 12/2008 | Watson et al. | 362/603 |
| 2009/0097905 | A1* | 4/2009 | Lapstun et al. | 401/195 |
| 2009/0160825 | A1* | 6/2009 | Payne | 345/179 |
| 2010/0021022 | A1* | 1/2010 | Pittel et al. | 382/123 |
| 2010/0294833 | A1* | 11/2010 | Silverbrook et al. | 235/375 |
| 2011/0014955 | A1* | 1/2011 | Kim et al. | 455/566 |

* cited by examiner

*Primary Examiner* — Anh Mai
*Assistant Examiner* — Kevin Quarterman
(74) *Attorney, Agent, or Firm* — Altis Law Group, Inc.

(57) ABSTRACT

An electronic reader system includes an electronic book and a stylus. The electronic book includes a battery and a cover. The stylus includes a pen body for writing on the electronic book to input data or commands into the electronic book, and an illumination member detachably attached to the pen body. The illumination member can be detached from the pen body and attached onto the electronic book, receiving electrical power from the book as it does so, to illuminate the electronic book.

12 Claims, 4 Drawing Sheets

ELECTRONIC READING SYSTEM

BACKGROUND

1. Technical Field

The present disclosure relates to an electronic reading system.

2. Description of Related Art

In recent years, electronic reading devices such as electronic books have become more and more popular. An electronic book usually adopts a reflection type display that does not need backlighting. The display relies on ambient light to display information, and the display is often very difficult to read in low ambient light condition and reading in the dark is impossible. Thus, users cannot use the electronic book in darkness or in low ambient light.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
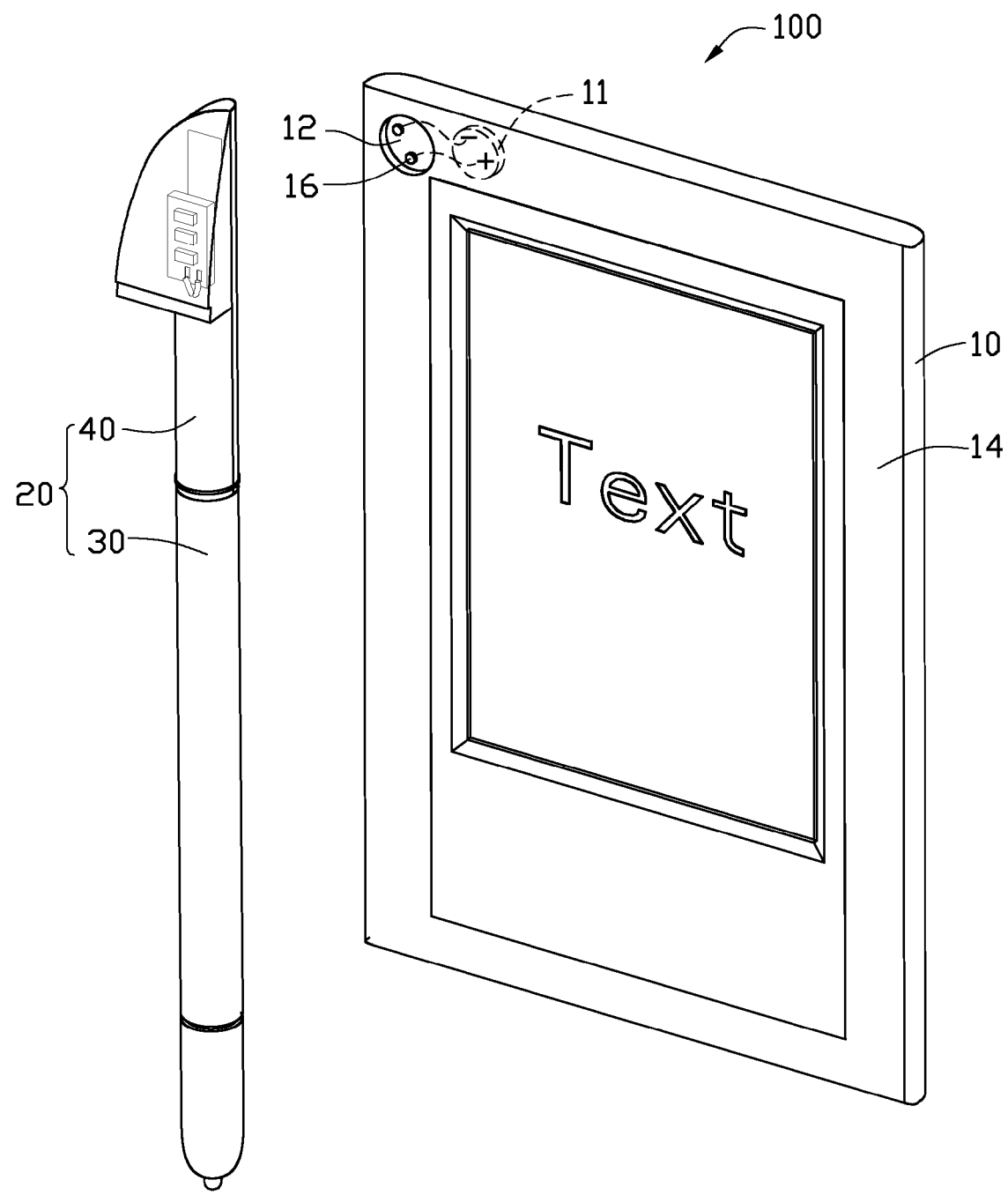
FIG. 1 is an isometric view of an electronic reader device according to an exemplary embodiment.

Referring to FIG. 1, an electronic reading system 100 according to an exemplary embodiment includes an electronic book 10 and a stylus 20. The electronic book 10 includes a cover 14 defining a depression or socket or (recess 12). Two first conductive contacts 16 are set in the recess 12. The two first conductive contacts 16 are respectively connected to a positive pole (not labeled) and a negative pole (not labeled) of a battery 11 installed in the electronic book 10. In the exemplary embodiment, the first conductive contacts 16 are cylinders made from rolled up sheets of copper foil. The stylus 20 includes a pen body 30 and an illumination member 40. The pen body 30 is used for writing on the electronic book 10 to input data or commands to the electronic book 10. The illumination member 40 is elongated and detachably attached to the pen body 30. When detached from the pen body 30, the illumination member 40 can be fixed in the recess 12.

Figure 2:
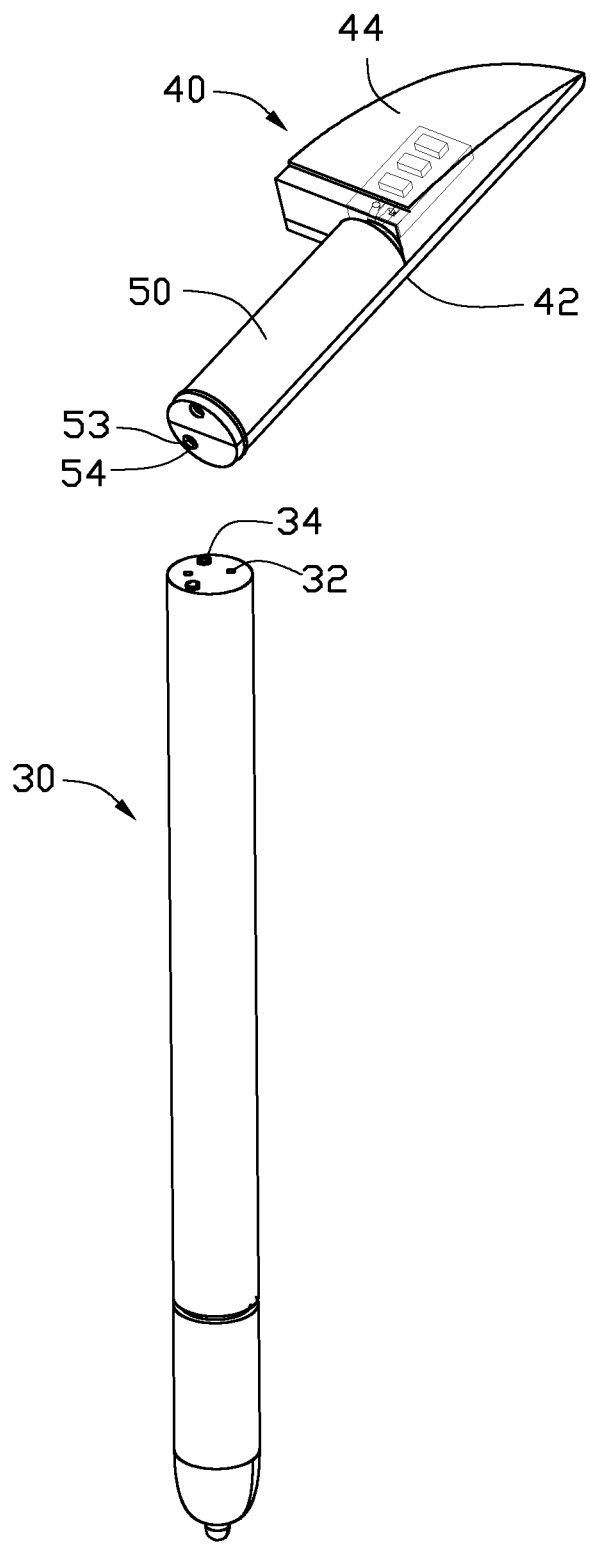
FIG. 2 is an exploded view of the stylus of the electronic reader device in FIG. 1.
Figure 3:
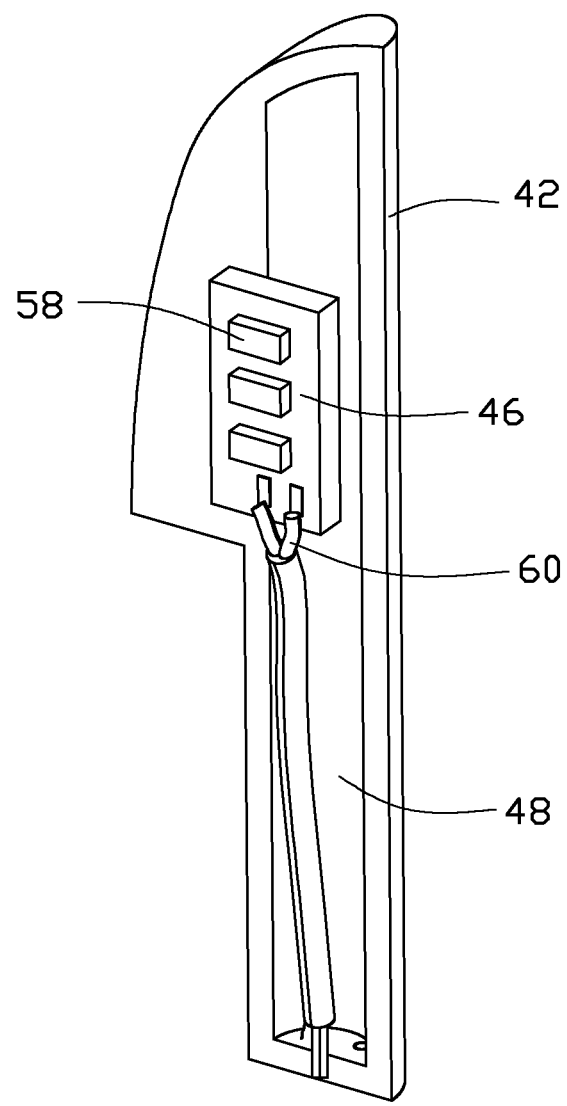
FIG. 3 is a cross-sectional view of the illumination member of the stylus in FIG. 2.

Referring to FIGS. 2 and 3, the illumination member includes a first shell 42 and a second shell 44 fixed to the first shell 42. A receiving space (not labeled) is formed between the first shell 42 and the second shell 44 for accommodating a circuit board 46. The first shell 42 includes a cylindrical connecting portion 50 defining a cavity 48. One end of the connecting portion 50 defines two holes 54 communicating with the cavity 48. The two holes 54 are opposite to the two first conductive contacts 16. Two exposed second conductive contacts 53 are respectively received in the two holes 54 to allow numerous mounting and demounting cycles. In the embodiment, the second conductive contacts 53 are cylinders made from rolled up sheets of copper foil. The circuit board 46 is mounted on a number of light emitting diodes 58. Two wires 60 are electrically connected to the circuit board 46. The two wires 60 pass through the cavity 48 to respectively connect with the two second conductive contacts. The second shell 44 is transparent to allow the emission of light from the light emitting diodes 58.

Two magnets 32 are set on one end of the pen body 30 opposite to the connecting portion 50. The housings for the magnets 32 (or the magnets 32 themselves) and a shell of the pen body 30 can be integrally formed by molding. The connecting portion 50 can be made of metal. The magnets 32 are configured for magnetically attracting the connecting portion 50 to fix the illumination member 40 to the pen body 30. The pen body 30 includes two protruding posts 34 on the end thereof opposite to the connecting portion 50. The posts 34 can be fitted in the recesses 54 to fix the illumination member 40 to the pen body 30, thereby covering the second conductive contacts 53.

Figure 4:
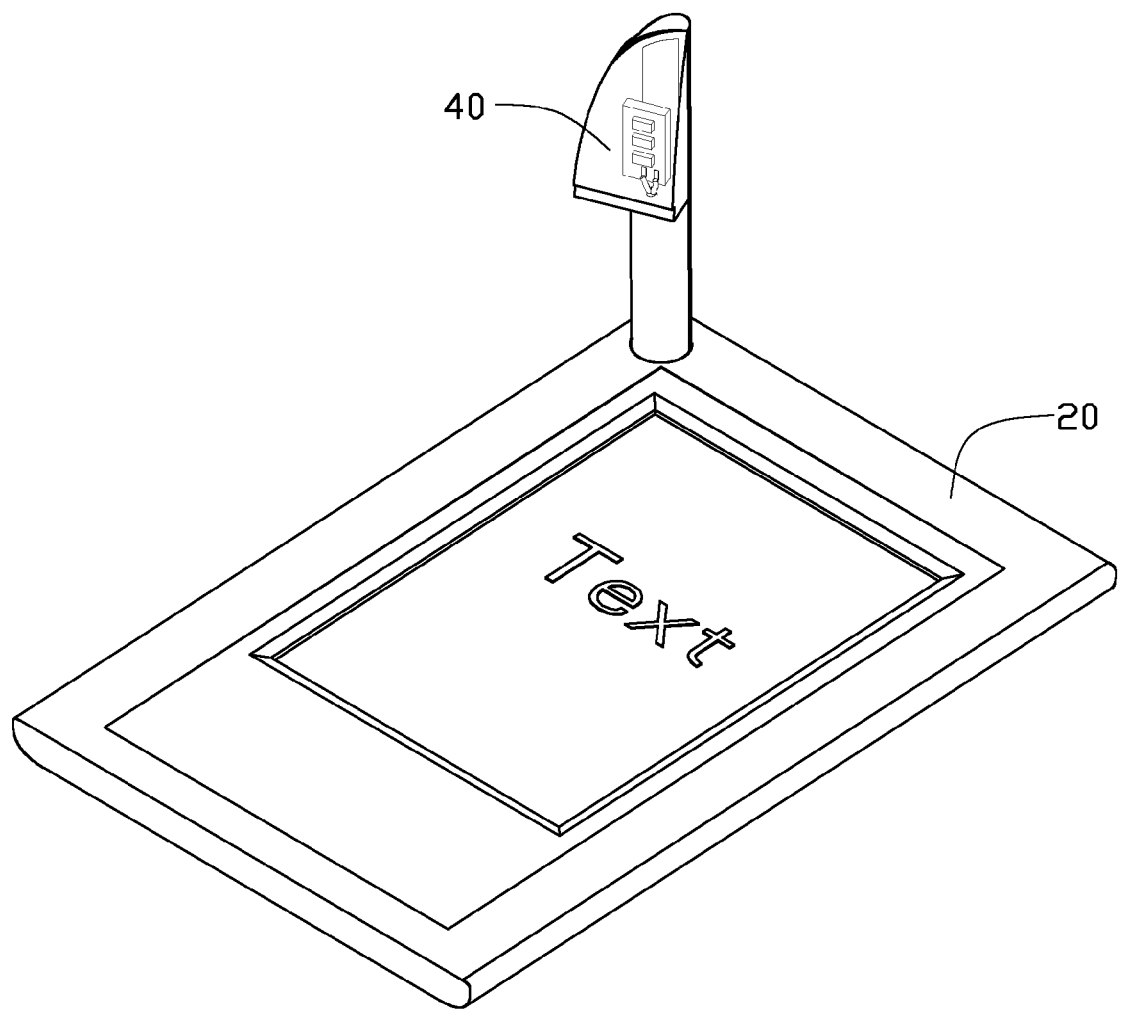
FIG. 4 is similar to FIG. 1, but with the stylus being affixed to the electronic book.

Referring to FIGS. 1, 2 and 4, in case of weak ambient light or darkness, the illumination member 40 can be detached from the pen body 30, and inserted into the recess 12 of the electronic book 10. The two first conductive contacts 16 are respectively received in the two recesses 54 and contact the corresponding two second conductive contacts. In the embodiment, the two first conductive contacts 16 make a secure but temporary fit with the two recesses 54, thereby fastening the illumination member 40 to the electronic book 10. Because the two first conductive contacts 16 are indirectly connected to the positive pole and the negative pole of the battery installed in the electronic book 10, the light-emitting diodes 58 are powered by the battery and lights up the display screen of the electronic book 10.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An electronic reader system comprising:
   an electronic book comprising a battery and a cover; and
   a stylus comprising a pen body for writing on the electronic book to input data or commands into the electronic book, and an illumination member detachably attached to the pen body;
   wherein the cover defines a recess, two first conductive contacts are set in the recess, the first conductive contacts are respectively connected to a positive pole and a negative pole of the battery, the illumination member comprises light sources and two exposed second conductive contacts electrically connected to the light sources, the illumination member is engageable in the recess with the first conductive contacts contacting the corresponding second conductive contacts.

2. The electronic reader system of claim 1, wherein the first conductive contacts are cylinders made from rolled up sheets of copper foil.

3. The electronic reader system of claim 1, wherein the second conductive contacts are cylinders made from rolled up sheets of copper foil.

4. The electronic reader system of claim 1, wherein the illumination member comprises a first shell, a second shell fixed to the first shell, and a circuit board positioned between the first shell and the second shell, the light sources mounted on the circuit board, the second shell is transparent, and the circuit board is electronically connected to the second conductive contacts.

5. The electronic reader system of claim 4, wherein the illumination member is elongated and has a first end with the light source arranged thereat and an opposing second end attached to the pen body, the second end has an end face with the second conductive contacts exposed thereat.

6. The electronic reader system of claim 1, wherein the illumination member is magnetically attached to the pen body.

7. The electronic reader system of claim 5, wherein the second conductive contacts are covered when the illumination member is attached to the pen body.

8. An electronic reader system comprising:
   an electronic book comprising a display screen, a battery and a casing receiving the battery; and
   a stylus comprising an illumination member;
   wherein the casing defines a recess, two first conductive contacts are exposed in the recess, the first conductive contacts are respectively connected to a positive pole and a negative pole of the battery, the illumination member comprises light sources configured for illuminating the display screen, and two second conductive contacts electrically connected to the light source, the illumination member is engageable in the recess in a manner that the first conductive contacts can contact the corresponding second conductive contacts.

9. The electronic reader system of claim 8, wherein the first conductive contacts are cylinders made from rolled up sheets of copper foil.

10. The electronic reader system of claim 8, wherein the second conductive contacts cylinders made from rolled up sheets of copper foil.

11. The electronic reader system of claim 8, wherein the illumination comprise a first shell, a second shell fixed to the first shell and a circuit board positioned between the first shell and the second shell, the light sources mounted on the circuit board, the second shell is transparent, and the circuit board electronically is electronically connects to the second conductive members contacts.

12. The electronic reader system of claim 11, wherein the illumination member is elongated and has a first end with the light source arranged thereat and an opposing second end attached to the pen body, the second end has an end face with the second conductive contacts exposed thereat.

* * * * *